United States Patent
Luo et al.

(10) Patent No.: US 10,231,170 B2
(45) Date of Patent: Mar. 12, 2019

(54) UPLINK SERVICE DATA TRANSMISSION METHOD AND APPARATUS

(71) Applicant: Huawei Technologies Co., Ltd., Shenzhen, Guangdong (CN)

(72) Inventors: Haiyan Luo, Shanghai (CN); Tianle Deng, Shanghai (CN); Hongzhuo Zhang, Shanghai (CN); Kaijie Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/464,811

(22) Filed: Mar. 21, 2017

(65) Prior Publication Data

US 2017/0195944 A1 Jul. 6, 2017

Related U.S. Application Data

(63) Continuation of application No. PCT/CN2014/087107, filed on Sep. 22, 2014.

(51) Int. Cl.
*H04W 28/08* (2009.01)
*H04W 48/08* (2009.01)
(Continued)

(52) U.S. Cl.
CPC .......... *H04W 48/08* (2013.01); *H04W 28/08* (2013.01); *H04W 72/04* (2013.01); *H04W 84/12* (2013.01); *H04W 88/08* (2013.01)

(58) Field of Classification Search
CPC ............. H04W 28/08; H04W 28/0289; H04W 72/0486; H04L 12/1407
See application file for complete search history.

(56) References Cited

U.S. PATENT DOCUMENTS 9,161,264 B2  10/2015  Liu
2008/0076425 A1*  3/2008  Khetawat .............. H04W 88/12
                                                    455/436
(Continued)

FOREIGN PATENT DOCUMENTS

CN  102647771 A  8/2012
CN  102833813 A  12/2012
(Continued)

OTHER PUBLICATIONS

3GPP TS 36.321 V12.3.0 (Sep. 2014), 3rd Generation Partnership Project; Technical Specification Group Radio Access Network; Evolved Universal Terrestrial Radio Access (E-UTRA); Medium Access Control (MAC) protocol specification (Release 12), 57 pages.

*Primary Examiner* — Raj Jain

(57) ABSTRACT

An uplink service data transmission method and apparatus. The method includes: receiving, by a wireless local area network WLAN access point AP, first indication information sent by a cellular network access device, where the first indication information is used to instruct the WLAN AP that user equipment UE served by the cellular network access device has uplink service data on which service offloading needs to be performed to the WLAN AP; and sending, by the WLAN AP, second indication information to the UE according to the first indication information, where the second indication information is used to instruct the UE to send the uplink service data to the WLAN AP.

19 Claims, 6 Drawing Sheets

(51) Int. Cl.
*H04W 72/04* (2009.01)
*H04W 84/12* (2009.01)
*H04W 88/08* (2009.01)

(56) References Cited

U.S. PATENT DOCUMENTS

| | | |
|---|---|---|
| 2012/0176929 A1 | 7/2012 | Choi |
| 2014/0133298 A1* | 5/2014 | Han .................. H04W 28/08 370/230 |
| 2014/0177448 A1* | 6/2014 | Wu .................. H04W 28/18 370/237 |
| 2014/0211626 A1 | 7/2014 | Liu |
| 2014/0334446 A1 | 11/2014 | Lim et al. |
| 2015/0023341 A1 | 1/2015 | Zhao et al. |
| 2015/0148038 A1* | 5/2015 | Griot .................. H04W 8/18 455/435.3 |
| 2015/0201410 A1 | 7/2015 | Tang et al. |
| 2016/0135100 A1* | 5/2016 | Teyeb .............. H04W 36/0055 370/331 |
| 2017/0195944 A1* | 7/2017 | Luo .................. H04W 48/08 |

FOREIGN PATENT DOCUMENTS

| | | |
|---|---|---|
| CN | 103002511 A | 3/2013 |
| CN | 103119980 A | 5/2013 |
| CN | 103228052 A | 7/2013 |
| CN | 103582079 A | 2/2014 |
| EP | 2624653 A1 | 8/2013 |
| EP | 2720508 A1 | 4/2014 |
| EP | 2773141 A1 | 9/2014 |
| EP | 3032871 A1 | 6/2016 |
| WO | 2011157152 A2 | 12/2011 |
| WO | 2013089414 A1 | 6/2013 |
| WO | 2014035619 A1 | 3/2014 |

\* cited by examiner

UPLINK SERVICE DATA TRANSMISSION METHOD AND APPARATUS

CROSS-REFERENCE TO RELATED APPLICATIONS

This application is a continuation of International Application No. PCT/CN2014/087107, filed on Sep. 22, 2014, the disclosure of which is hereby incorporated by reference in its entirety.

TECHNICAL FIELD

This application relates to the field of wireless communications technologies, and in particular, to an uplink service data transmission method and apparatus.

BACKGROUND

Network cooperation between a cellular network and a wireless local area network (WLAN) is a current research focus. In a scenario of cooperative transmission between the cellular network and the WLAN, on the one hand, a WLAN service that has been initiated in the WLAN may be transmitted in the WLAN; on the other hand, user equipment (English: user equipment, UE for short) served by the cellular network may offload some or all services initiated in the cellular network to the WLAN, so as to make full use of the WLAN to improve a throughput.

In the foregoing scenario, transmission in the WLAN is mainly based on a carrier sense multiple access with collision avoidance (CSMA/CA) contention mechanism. That is, multiple nodes including UE and a WLAN access point (AP) apply for a resource in a contention manner. If multiple WLAN APs send data at the same time, a conflict is to be caused, thereby resulting in a waste of resources. When there are many WLAN APs, a probability of such a conflict is greatly increased, thereby resulting in a severe decrease of system communication performance.

SUMMARY

Embodiments of this application provide an uplink service data transmission method and apparatus, so as to resolve a technical problem in the prior art that channel utilization is low due to a CSMA/CA contention mechanism.

A first aspect of this application provides an uplink service data transmission method, including:

receiving, by a wireless local area network WLAN access point AP, first indication information sent by a cellular network access device, where the first indication information is used to instruct the WLAN AP that user equipment UE served by the cellular network access device has uplink service data on which service offloading needs to be performed to the WLAN AP; and sending, by the WLAN AP, second indication information to the UE according to the first indication information, where the second indication information is used to instruct the UE to send the uplink service data to the WLAN AP.

With reference to the first aspect, in a first possible implementation manner of the first aspect, the first indication information is further used to notify identification information of the UE to the WLAN AP, and the identification information is used to identify the UE by the WLAN AP.

With reference to the first aspect or the first possible implementation manner of the first aspect, in a second possible implementation manner of the first aspect, the method further includes:

starting, by the WLAN AP, a timer; and after the timer times out, determining, by the WLAN AP, whether a channel is idle; and if the channel is idle, releasing, by the AP, a resource that is allocated to the UE to send the uplink service data.

A second aspect of this application provides an uplink service data transmission method, including:

receiving, by a cellular network access device, notification information sent by user equipment UE served by the cellular network access device, where the notification information is used to notify the cellular network access device that the UE needs to transmit uplink service data;

determining, by the cellular network access device according to the notification information, whether the UE has uplink service data on which service offloading needs to be performed; and if the UE has uplink service data on which service offloading needs to be performed, sending, by the cellular network access device, first indication information to a wireless local area network WLAN access point AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

With reference to the second aspect, in a first possible implementation manner of the second aspect, the notification information includes an identifier, and the identifier is used to indicate that the uplink service data that needs to be transmitted is the uplink data on which service offloading needs to be performed.

With reference to the second aspect or the first possible implementation manner of the second aspect, in a second possible implementation manner of the second aspect, the first indication information is further used to notify identification information of the UE to the WLAN AP.

With reference to the second aspect, the first possible implementation manner of the second aspect, or the second possible implementation manner of the second aspect, in a third possible implementation manner of the second aspect, the method further includes:

sending, by the cellular network access device, third indication information to the UE, where the third indication information is used to instruct the UE to send the uplink service data on which service offloading needs to be performed to the WLAN AP.

A third aspect of this application provides an uplink service transmission method, including:

receiving, by user equipment UE served by the cellular network access device, second indication information sent by a wireless local area network WLAN access point AP according to first indication information received from the cellular network access device, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP; and sending, by the UE, the uplink service data on which service offloading needs to be performed to the WLAN AP.

With reference to the third aspect, in a first possible implementation manner of the third aspect, the method further includes:

sending, by the UE, notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

With reference to the first possible implementation manner of the third aspect, in a second possible implementation manner of the third aspect, the notification information includes an identifier, and the identifier is used to indicate that the uplink service data that needs to be transmitted is the uplink service data on which service offloading needs to be performed.

A fourth aspect of this application provides a wireless local area network WLAN access point AP, including:

a receiving unit, configured to receive first indication information sent by a cellular network access device, where the first indication information is used to instruct the WLAN AP that user equipment UE served by the cellular network access device has uplink service data on which service offloading needs to be performed to the WLAN AP; and a sending unit, configured to send second indication information to the UE according to the first indication information, where the second indication information is used to instruct the UE to send the uplink service data to the WLAN AP.

With reference to the fourth aspect, in a first possible implementation manner of the fourth aspect, the first indication information is further used to notify identification information of the UE to the WLAN AP, and the identification information is used to identify the UE by the WLAN AP.

With reference to the fourth aspect or the first possible implementation manner of the fourth aspect, in a second possible implementation manner of the fourth aspect, the AP further includes a processing unit, configured to start a timer; and after the timer times out, the processing unit determines whether a channel is idle; and if the channel is idle, the processing unit releases a resource that is allocated to the UE to send the uplink service data.

A fifth aspect of this application provides a cellular network access device, including:

a receiving unit, configured to receive notification information sent by user equipment UE served by the cellular network access device, where the notification information is used to notify the cellular network access device that the UE needs to transmit uplink service data;

a processing unit, configured to determine, according to the notification information, whether the UE has uplink service data on which service offloading needs to be performed; and a sending unit, configured to: if the UE has the uplink service data on which service offloading needs to be performed, send first indication information to a wireless local area network WLAN access point AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

With reference to the fifth aspect, in a first possible implementation manner of the fifth aspect, the notification information includes an identifier, and the identifier is used to indicate that the uplink service data that needs to be transmitted is the uplink data on which service offloading needs to be performed.

With reference to the fifth aspect or the first possible implementation manner of the fifth aspect, in a second possible implementation manner of the fifth aspect, the first indication information is further used to notify identification information of the UE to the WLAN AP.

With reference to the fifth aspect, the first possible implementation manner of the fifth aspect, or the second possible implementation manner of the fifth aspect, in a third possible implementation manner of the fifth aspect, the sending unit is further configured to send third indication information to the UE, where the third indication information is used to instruct the UE to send the uplink service data on which service offloading needs to be performed to the WLAN AP.

A sixth aspect of this application provides user equipment UE, including:

a receiving unit, configured to receive second indication information sent by a wireless local area network WLAN access point AP according to first indication information received from a cellular network access device serving the UE, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP; and a sending unit, configured to send the uplink service data on which service offloading needs to be performed to the WLAN AP.

With reference to the sixth aspect, in a first possible implementation manner of the sixth aspect, the sending unit is further configured to send notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

With reference to the first possible implementation manner of the sixth aspect, in a second possible implementation manner of the sixth aspect, the notification information includes an identifier, and the identifier is used to indicate that the uplink service data that needs to be transmitted is the uplink service data on which service offloading needs to be performed.

A seventh aspect of this application provides a wireless local area network WLAN access point AP, including:

a receiver, configured to receive first indication information sent by a cellular network access device, where the first indication information is used to instruct the WLAN AP that user equipment UE served by the cellular network access device has uplink service data on which service offloading needs to be performed to the WLAN AP; and a transmitter, configured to send second indication information to the UE according to the first indication information, where the second indication information is used to instruct the UE to send the uplink service data to the WLAN AP.

With reference to the seventh aspect, in a first possible implementation manner of the seventh aspect, the first indication information is further used to notify identification information of the UE to the WLAN AP, and the identification information is used to identify the UE by the WLAN AP.

With reference to the seventh aspect or the first possible implementation manner of the seventh aspect, in a second possible implementation manner of the seventh aspect, the AP further includes a processor and a timer, where the processor is configured to start the timer; and after the timer times out, determine whether a channel is idle; and if the channel is idle, release a resource that is allocated to the UE to send the uplink service data.

An eighth aspect of this application provides a cellular network access device, including:

a receiver, configured to receive notification information sent by user equipment UE served by the cellular network access device, where the notification information is used to notify the cellular network access device that the UE needs to transmit uplink service data;

a processor, configured to determine, according to the notification information, whether the UE has uplink service data on which service offloading needs to be performed; and a transmitter, configured to: if the UE has the uplink service data on which service offloading needs to be performed, send first indication information to a wireless local area network WLAN access point AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

With reference to the eighth aspect, in a first possible implementation manner of the eighth aspect, the notification information includes an identifier, and the identifier is used to indicate that the uplink service data that needs to be transmitted is the uplink data on which service offloading needs to be performed.

With reference to the eighth aspect or the first possible implementation manner of the eighth aspect, in a second possible implementation manner of the eighth aspect, the first indication information is further used to notify identification information of the UE to the WLAN AP.

With reference to the eighth aspect, the first possible implementation manner of the eighth aspect, or the second possible implementation manner of the eighth aspect, in a third possible implementation manner of the eighth aspect, the transmitter is further configured to send third indication information to the UE, where the third indication information is used to instruct the UE to send the uplink service data on which service offloading needs to be performed to the WLAN AP.

A ninth aspect of this application provides user equipment UE, including:

a receiver, configured to receive second indication information sent by a wireless local area network WLAN access point AP according to first indication information received from a cellular network access device serving the UE, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP; and a transmitter, configured to send the uplink service data on which service offloading needs to be performed to the WLAN AP.

With reference to the ninth aspect, in a first possible implementation manner of the ninth aspect, the transmitter is further configured to send notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

With reference to the first possible implementation manner of the ninth aspect, in a second possible implementation manner of the ninth aspect, the notification information includes an identifier, and the identifier is used to indicate that the uplink service data that needs to be transmitted is the uplink service data on which service offloading needs to be performed.

The one or more technical solutions provided in the embodiments of this application have at least the following technical effects or advantages:

In an uplink service data transmission method provided in the embodiments of this application, a WLAN AP receives first indication information sent by a cellular network access device, where the first indication information instructs the WLAN AP that UE served by the cellular network access device has uplink service data on which service offloading needs to be performed on the AP; further, the AP sends second indication information to the UE according to the first indication information, where the second indication information is used to instruct the UE to send the uplink service data to the AP. Therefore, in the embodiments, an AP in a non-cellular network can learn, by using the cellular network access device, that the UE has uplink data to send, so as to instruct the UE that has data to send to send the uplink service data on a WLAN network. This can avoid low channel utilization that is caused because a PCF mechanism in an existing WLAN technology further needs to perform polling on UE that has no data to send, thereby improving WLAN channel utilization.

DETAILED DESCRIPTION

Figure 1:
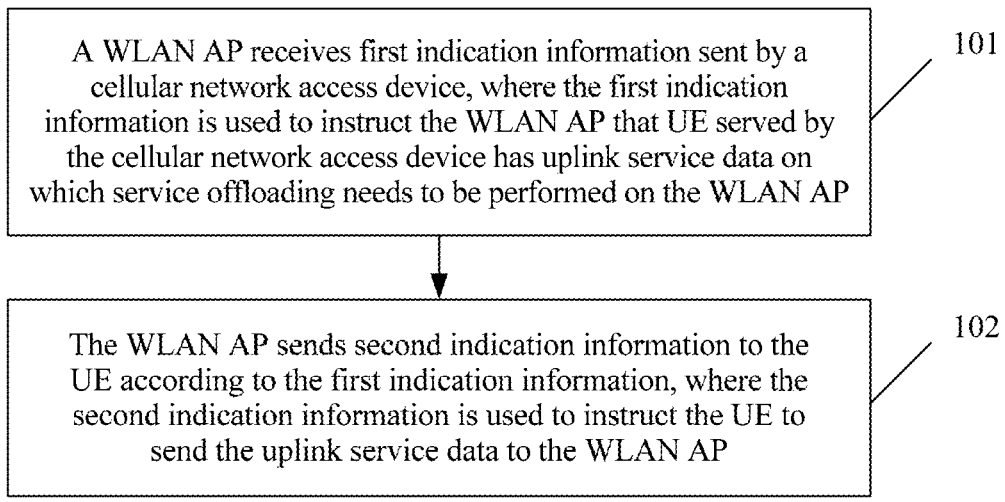
FIG. 1 is a flowchart of an uplink service data transmission method on an AP side according to an embodiment of this application.

Embodiments of this application provide an uplink service data transmission method and apparatus, so as to resolve a technical problem in the prior art that channel utilization is low due to a CSMA/CA contention mechanism.

To make the objectives, technical solutions, and advantages of the embodiments of this application clearer, the following clearly describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

This specification describes various aspects with reference to user equipment, a wireless local area network access point, and/or a base station.

The user equipment mentioned in this specification may be a wireless terminal or a wired terminal. The wireless terminal may refer to a device that provides a user with voice and/or another service data connectivity device, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (Session Initiation Protocol) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or user equipment (User Device or User Equipment).

The wireless local area network access point in this specification may be an independent access point using a wireless local area network (WLAN) technology, or may be integrated in an existing base station, for example, be integrated in a base transceiver station (BTS) in the Global System for Mobile communications (GSM) or Code Division Multiple Access (CDMA), or may be integrated in a NodeB (NB) in Wideband Code Division Multiple Access (WCDMA), or may be an evolved NodeB (eNB or eNodeB) in Long Term Evolution (LTE), a relay station, an access point, a base station device in a future 5G network, or the like.

A base station in a cellular network in this specification may be a device that communicates with the wireless terminal over an air interface in an access network by using one or more sectors. The base station may be configured to mutually convert a received over-the-air frame and an Internet Protocol (IP) packet and serve as a router between the wireless terminal and a rest portion of the access network, where the rest portion of the access network may include an IP network. The base station may coordinate attribute management of the air interface. For example, the base station may be a base transceiver station (BTS) in the Global System for Mobile communications (GSM) or Code Division Multiple Access (CDMA), or may be a NodeB (NB) in Wideband Code Division Multiple Access (WCDMA), or may be an evolved NodeB (eNB or eNodeB) in Long Term Evolution (LTE), a relay station, an access point, or abase station in a future 5G network. This application sets no limitation.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An embodiment provides an uplink service data transmission method. As shown in FIG. 1, FIG. 1 is a flowchart of the uplink service data transmission method according to this embodiment. The method includes the following content.

Step 101: The WLAN AP (hereinafter referred to as the AP) receives first indication information sent by a cellular network access device, where the first indication information is used to instruct the WLAN AP that UE served by the cellular network access device has uplink service data on which service offloading needs to be performed to the WLAN AP.

Step 102: The WLAN AP sends second indication information to the UE according to the first indication information, where the second indication information is used to instruct the UE to send the uplink service data to the WLAN AP.

For example, the cellular network access device is a base station in a cellular network.

In step 101, the first indication information may be carried in any communication message between the cellular network access device and the AP.

Optionally, the first indication information further includes a data volume of the uplink service data on which service offloading needs to be performed. For example, a size of the data volume is 1000 bytes.

Optionally, the first indication information is further used to notify identification information of the UE to the WLAN AP, and the identification information is used to identify the UE by the WLAN AP.

It should be noted that, in the cellular network and the WLAN, identifiers of the same UE may be the same. For example, the UE has a globally unified identifier in the cellular network and the WLAN, that is, an international mobile subscriber identity (English: International Mobile Subscriber Identification Number, IMSI for short) on a subscriber identity module (SIM) card.

However, the identifiers of the same UE may be different in different networks. In this case, matching needs to be performed on the identifiers of the same UE in two different networks. In a specific implementation process, there are many possible implementation manners. For example, the UE notifies the cellular network access device, such as a base station, of a Media Access Control (MAC) address that is of the UE and in the WLAN. Then, the base station matches an identifier that is of the UE and in the cellular network, such as a cell radio network temporary identifier (C-RNTI), with the MAC address. Subsequently, when the UE corresponding to the C-RNTI has the uplink data that needs to be transmitted in the WLAN, the base station may notify the WLAN AP that a MAC address corresponding to the C-RNTI is used as the UE identifier. Alternatively, the base station notifies the WLAN AP of a matching relationship between a C-RNTI and a MAC address. When the base station notifies the AP that UE corresponding to a C-RNTI has uplink data that needs to be transmitted in the WLAN, the AP may find a MAC address corresponding to the UE according to the matching relationship. For another example, the UE notifies the WLAN AP of the identifier that is of the UE and in the cellular network, such as the C-RNTI. The base station notifies the WLAN AP that UE corresponding to a C-RNTI has uplink data that needs to be transmitted in the WLAN, and the WLAN AP may find, according to the matching relationship, a MAC address corresponding to the UE. Alternatively, the AP notifies the base station of the matching relationship between a C-RNTI and a MAC address. The base station may use the MAC address as the UE identifier, and notifies the WLAN AP that the UE has the uplink data that needs to be transmitted in the WLAN. In the following description, it is assumed that the AP and the cellular network access device have obtained a matching relationship between identifiers that are of the UE and in the two networks.

After the first indication information is received in step 101, step 102 is performed, and the second indication information is sent to the UE, where the second indication information is used to instruct the UE to send the uplink service data to the WLAN AP.

Optionally, the WLAN AP may schedule the UE by using a mechanism similar to a point coordination function (PCF) mechanism. However, different from the PCF mechanism, polling does not need to be performed on all UE, and polling may be performed only on UE that has an offloaded service. This avoids a case in which the AP performs polling on UE but the UE has no to-be-sent data packet, so that channel utilization can be improved, thereby improving scheduling efficiency. In the PCF mechanism, the AP sends a poll (Poll) frame to the UE that has the uplink service data, that is, sends the second indication information to the UE, and starts a timer at the same time, where a length of the timer is a point coordination function interframe space (PIFS). If the UE has uplink data to send, the UE sends the uplink data after waiting for a short interframe space (SIFS). On the contrary, if the AP receives, after waiting for the PIFS, no uplink data sent by the UE, the AP considers that the UE has no uplink data to send, and continues to perform polling on next UE.

Optionally, the AP may further schedule the UE in the following manner: When the AP wants to schedule UE that has uplink service data, the AP may actively send a clear to send (CTS) frame, which may be the foregoing second indication information, to the UE when no request to send (RTS) frame is received. After detecting the CTS, other UE does not contend for a channel during a network allocation vector (NAV) indicated by the CTS. After detecting the CTS, in an implementation manner, the scheduled UE may directly send the uplink service data after the short interframe space (SIFS).

Optionally, the AP may start the timer. After the timer times out, if the AP finds that a channel is idle, the UE temporarily has no uplink data to send, and a resource that is allocated to the UE to send the uplink service data is released. Subsequently, the next UE is scheduled. For example, a size of the timer may be the PIFS or larger (for example, including a DIFS+backoff (backoff) time).

In another implementation manner, the UE determines that the UE receives the CTS but sends no RTS, and may consider the CTS frame as an error frame and discard the CTS frame. Because the UE has data to send, according to a normal CSMA/CA mechanism, first it is sensed that a channel is idle, and after a distributed coordination function interframe space (DIFS), backoff is performed according to a specific rule for backoff time. If the channel is still idle after the backoff ends, the UE directly sends a data packet. No other UE contends for the channel due to the NAV carried in the CTS, and therefore a success of contending for the channel can be ensured. Likewise, the AP may start the timer, and a length of the timer may be set to DIFS+backoff. If the timer times out and no uplink data packet sent by the UE is received, it is considered that the UE has no uplink data to send. Subsequently, the next UE is scheduled.

Optionally, a first network side device may specifically further use a hybrid coordination function (HCF) mechanism or a power save multi-poll (PSMP) mechanism to schedule the UE that needs to perform service offloading.

Optionally, in step 102, after the AP sends the second indication information, scheduling is performed continually until a data volume of the to-be-sent data of the UE is estimated as 0, or until the timer times out and no uplink data packet sent by the UE is received. In this case, it can be determined that all the current data volume has been sent. Subsequently, the UE is not scheduled until the first indication information of the UE is received next time.

When the AP schedules the UE, the UE transmits to-be-sent data generated by an application or uplink service data in a data buffer in a transmission manner in the WLAN network.

For an AP, there are generally many UEs. In other words, one AP can schedule multiple UEs. Therefore, in the method of this embodiment, with assistance of a cellular network access device, the AP can learn whether each UE has to-be-sent data, and even can learn a to-be-sent data volume of each UE. Therefore, scheduling may be performed according to whether there is to-be-sent data and/or a to-be-sent data volume of UE. Compared with a CSMA/CA-based contention access manner in the prior art, the uplink service data transmission method in this embodiment of this application has higher efficiency.

Figure 2:
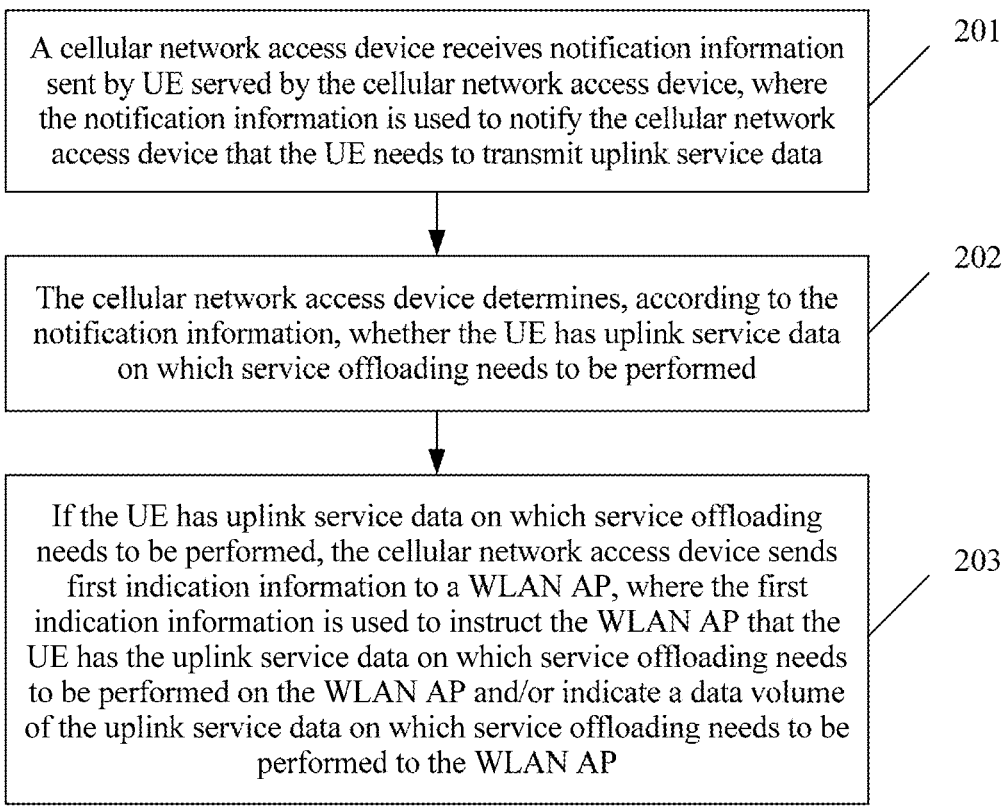
FIG. 2 is a flowchart of an uplink service data transmission method on a cellular network access device side according to an embodiment of this application.

In the following, as shown in FIG. 2, FIG. 2 is a flowchart of an uplink service data transmission method on a cellular network access device side according to an embodiment of this application. The method includes the following content.

Step 201: A cellular network access device receives notification information sent by UE served by the cellular network access device, where the notification information is used to notify the cellular network access device that the UE needs to transmit uplink service data.

Step 202: The cellular network access device determines, according to the notification information, whether the UE has uplink service data on which service offloading needs to be performed.

Step 203: If the UE has uplink service data on which service offloading needs to be performed, the cellular network access device sends first indication information to a WLAN AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

In step 201, the notification information may be specifically implemented in multiple implementation manners, for example, may be newly-defined notification information, a scheduling request (SR), or a buffer status report (BSR) or a BSR added with an identifier indicating whether to offload.

A newly-defined notification information, for example, only includes a UE identifier, or for another example, includes a UE identifier and a to-be-transmitted data volume corresponding to the UE. The to-be-transmitted data volume may be a specific value, such as 1000 bytes; or may be a level corresponding to the to-be-transmitted data volume, such as a level 5 corresponding to 1000 bytes. For another example, the newly-defined notification information includes a UE identifier, a to-be-transmitted data volume corresponding to the UE, and an identifier indicating whether to offload. If the notification information only includes the UE identifier, it is considered that the UE has uplink data to offload to the WLAN; however, a specific to-be-transmitted data volume is unknown. For example, the UE identifier is a MAC address 1, and the to-be-transmitted data volume is 1000 bytes. For example, the UE identifier is a C-RNTI 1, and the to-be-transmitted data volume is 1000 bytes. For example, the UE identifier is a MAC address 1, the to-be-transmitted data volume is 1000 bytes, and the identifier indicating whether to offload is yes. If uplink data of multiple UEs is to be offloaded to the WLAN at the same time, the notification information only includes a UE identifier list, or includes a UE identifier list and a to-be-transmitted data volume corresponding to each UE.

The following describes a case in which the notification information is a scheduling request (SR), or a buffer status report (BSR).

In an LTE standard, the BSR is classified into a long BSR (Long BSR) and a short BSR (Short BSR). In a current timeslot, if the UE has data of more than one logical channel group (LCG) to transmit, the long BSR is sent; or if the UE does not have data of more than one logical channel group to transmit, the short BSR is sent. The long BSR gives, according to a specified order, a value that represents a data volume and is corresponding to each LCG. For example, an LCG 0/1/2/3 separately corresponds to 100/200/300/400 bytes. The data volume is a data volume of a to-be-sent data packet of the UE, that is, 1000 bytes. As specified in a current 3rd Generation Partnership Project (3GPP) protocol, the BSR includes to-be-sent data volumes respectively corresponding to the four LCGs. The short BSR includes an LCG identifier (ID) and a corresponding value representing a data volume. In a specific implementation process, the value representing the data volume may be specifically the data volume. For example, if a to-be-sent data packet is 1000 bytes, a value carried in the BSR is 1000, or may be a level value corresponding to a data volume. For example, 1 to 10 bytes correspond to a level value 1, and 10 to 12 bytes correspond to a level value 2. For details, refer to tables 6.1.3.1-1 and 6.1.3.1-2 in the protocol 36.321.

Alternatively, the cellular network access device receives a BSR that is sent by the UE and added with an identifier indicating whether to offload. In addition to the foregoing necessary information, the identifier indicating whether to offload is added to the BSR. For example, one bit is used as a flag bit indicating whether to offload, and if a value is 1, it indicates that the offloading is required; or if a value is 0, it indicates that the offloading is not required.

After receiving the BSR sent by the UE, the cellular network access device may learn whether the UE has to-be-sent data, and data volumes of to-be-sent data respectively corresponding to one LCG or multiple LCGs.

If the notification information is the SR, the cellular network access device learns that the UE has uplink service data to send. Specifically, an existing mechanism in a cellular network may be used to obtain the SR. For example, whenever to-be-sent data of the UE emerges, an SR is triggered and reported; correspondingly, the cellular network access device, such as a base station, may receive the SR.

After the notification information is received in step 201, step 202 is performed subsequently. That is, whether the UE has uplink service data on which service offloading needs to be performed is determined according to the notification information.

In a specific implementation process, step 202 may be performed in multiple implementation manners, which are separately described in the following by using examples.

EXAMPLE 1

In step 201, the cellular network access device receives an SR or a BSR sent by the UE. In step 202, the cellular network access device may determine whether the UE is to be scheduled by the cellular network access device, whether the UE is to be scheduled by the AP, or whether the UE is to be scheduled by both the cellular network access device and the AP. If what the cellular network access device receives is the BSR sent by the UE, in addition to determining an object by which the UE is scheduled, the eNB needs to determine, according to loads, channel conditions, and the like of the eNB and the WLAN network and the BSR, how much to-be-sent data is to be offloaded to the WLAN network. For example, a total to-be-sent data volume of the UE that is shown in the BSR is 1000 bytes. The eNB determines that all the 1000 bytes are to be offloaded to the WLAN; or 500 bytes are to be of floaded to the WLAN, and the remaining 500 bytes are to be scheduled by the eNB.

EXAMPLE 2

The cellular network access device receives a BSR that is sent by the UE and added with an identifier indicating whether to offload. For ease of description, the BSR added with the identifier indicating whether to offload is referred to as a second BSR. When the cellular network access device receives the BSR added with the identifier indicating whether to offload, it can be determined that the UE has uplink service data on which service offloading needs to be performed.

In this embodiment, a first BSR and the second BSR may be specifically different types of BSRs. The second BSR may inherit a format of the first BSR. That is, the long BSR and the short BSR are distinguished, and the flag bit indicating whether to offload is added. Alternatively, the second BSR may only include the UE identifier and all to-be-offloaded data volumes of the UE.

In another possible embodiment, the UE sends two second BSRs at the same time, and the two second BSRs are distinguished according to different values in the flag bit indicating whether to offload. The flag bit is used to identify whether it is required to offload a service to the WLAN. For example, a value of a flag bit of a BSR1 is 0, indicating that data represented by the BSR1 does not need to be offloaded to a network in which a first network side device is located. Therefore, the cellular network access device determines that the UE has no uplink service data on which service offloading needs to be performed, and the cellular network access device may schedule the UE according to the BSR1. A value of a flag bit of a BSR2 is 1, indicating that data represented by the BSR2 needs to be offloaded to the WLAN for sending. Therefore, the cellular network access device determines that the UE has uplink service data on which service offloading needs to be performed, and sends the first indication information to the AP in step 203.

Optionally, before the cellular network access device receives the second BSR sent by the UE, the method further includes: sending, by the cellular network access device, third indication information to the UE, where the third indication information is used to instruct the UE to send the uplink service data on which service offloading needs to be performed to the WLAN AP, and instruct the UE to set a flag bit of the second BSR.

The indication command indicates that a service needs to be offloaded to the WLAN. Therefore, the UE may notify, by setting a value of a flag bit indicating whether to offload, the cellular network access device that a data volume carried by which BSR needs to be offloaded to the WLAN.

In an actual application, the indication command may include an offloading policy. Specifically, the UE may be notified by using a broadcast or a radio resource control (RRC) protocol.

EXAMPLE 3

The notification information received in step 201 includes the identifier indicating whether to offload. The identifier indicating whether to offload is used to indicate that the uplink service data that needs to be transmitted is the uplink service data on which service offloading needs to be performed. Therefore, instep 202, the cellular network access device determines, by detecting whether the notification information includes the identifier indicating whether to offload, whether there is uplink service data that needs to be offloaded.

Optionally, in step 203, the cellular network access device may separately send first indication information of each UE to the AP. However, in an actual application, first indication information of multiple UEs may be sent in one message at the same time. For example, when the first indication information includes an indication indicating there is data and an indication indicating there is no data, the cellular network access device sends a position correspondence between a UE identifier and an indication bitmap to the first network side device, as shown in Table 1.

TABLE 1

| UE1 | UE2 | UE3 | UE4 | UE5 | UE6 | UE7 |
| --- | --- | --- | --- | --- | --- | --- |

Then, the cellular network access device sends, according to the position correspondence between a UE identifier and an indication bitmap, an indication list of the multiple UEs to the first network side device, as shown in Table 2, where one bit is used to indicate an indication.

TABLE 2

| 1 | 0 | 1 | 1 | 0 | 0 | 0 |
| --- | --- | --- | --- | --- | --- | --- |

When receiving a message of Table 2, the AP may learn that UE1, UE3, and UE4 have uplink data to send.

Similarly, if the first indication information includes a data volume, the cellular network access device may first send a position correspondence between a UE identifier and a data volume bitmap to the first network side device, as shown in Table 1; and then send an obtained list of data volumes of the multiple UEs to the first network side device in step 202, as shown in Table 3.

TABLE 3

| 12 | 54 | 0 | 8 | 31 | 0 | 46 |
| --- | --- | --- | --- | --- | --- | --- |

In Table 3, it is assumed that a data volume is represented by a level value. It is assumed that there are 64 levels in total, from 0 to 63, where 0 indicates that there is no uplink data. For details about another level, refer to the tables 6.1.3.1-1 and 6.1.3.1-2 in the protocol 36.321. Each UE corresponds to six bits. When receiving a message of Table 3, the AP may learn that a level of a data volume of the UE1 is 12, and the UE3 and UE6 have no uplink service data to send.

Optionally, the method further includes: sending, by the cellular network access device, third indication information to the UE, where the third indication information is used to instruct the UE to send the uplink service data on which service offloading needs to be performed to the WLAN AP.

Figure 3:
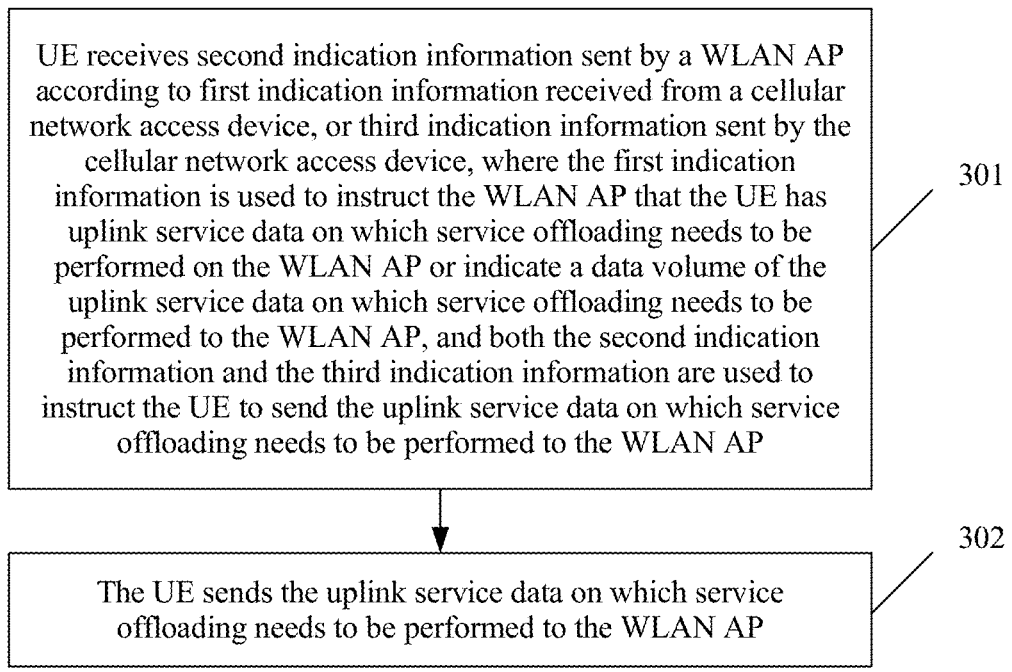
FIG. 3 is a flowchart of an uplink service data transmission method on a UE side according to an embodiment of this application.

In the following, as shown in FIG. 3, FIG. 3 is a flowchart of an uplink service data transmission method on a UE side according to an embodiment of this application. The method includes the following content.

Step 301: UE receives second indication information sent by a WLAN AP according to first indication information received from a cellular network access device, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP.

Step 302: The UE sends the uplink service data on which service offloading needs to be performed to the WLAN AP.

Meanings of the first indication information, the second indication information, and the third indication information in this embodiment are the same as those in the foregoing description. Therefore, details are not described herein.

Optionally, the method further includes: sending, by the UE, notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

Optionally, the notification information includes an identifier indicating whether to offload, where the identifier indicating whether to offload is used to indicate that the uplink service data that needs to be transmitted is the uplink data on which service offloading needs to be performed.

Optionally, the UE may determine, by using a preset policy, the uplink service data on which service offloading needs to be performed. There may be various preset policies. For example, 60% data is allocated to a WLAN, and 40% data is allocated to a cellular network. For another example, data generated by a first service, such as a Voice over Internet Protocol (VoIP) call, is allocated to the cellular network, and data generated by a second service, such as a video service, is allocated to the WLAN. The preset policy may be specifically specified by a protocol, or may be determined by the UE.

To describe an implementation process of the uplink service data transmission method in this embodiment of this application more clearly, the following makes description by using some specific examples separately.

Figure 4:
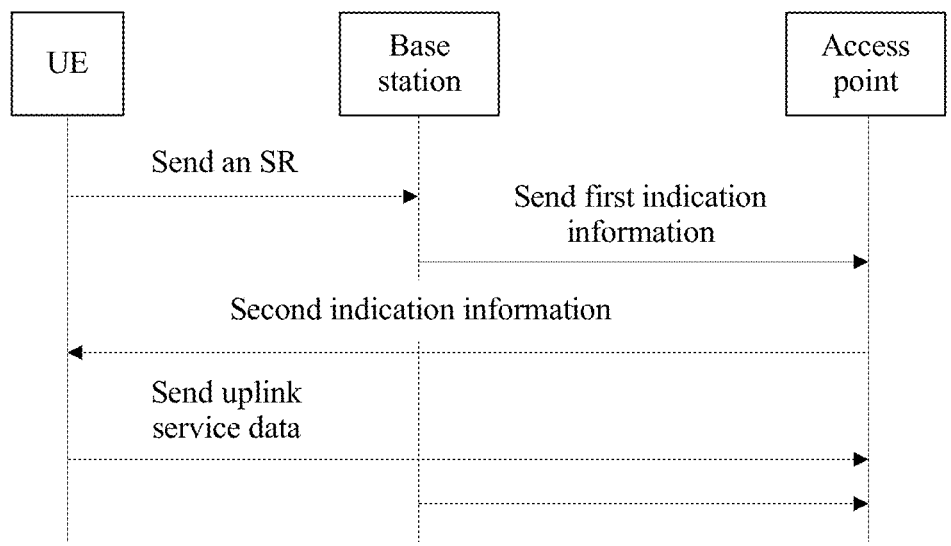
FIG. 4 is a schematic diagram of a specific instance of uplink service data transmission according to an embodiment of this application.

First, as shown in FIG. 4, FIG. 4 is a specific instance of the uplink service data transmission method according to this embodiment of this application. A base station in a cellular network is used as an example of the cellular network access device.

First, when the UE has uplink data, the UE reports an SR to the base station. Then, the base station sends the first indication information to the access point. After receiving the first indication information, the access point learns that the UE has the uplink data to send, and then sends the second indication information to the UE to schedule the UE. Then, based on the second indication information, the UE sends the uplink service data to the access point.

Figure 5:
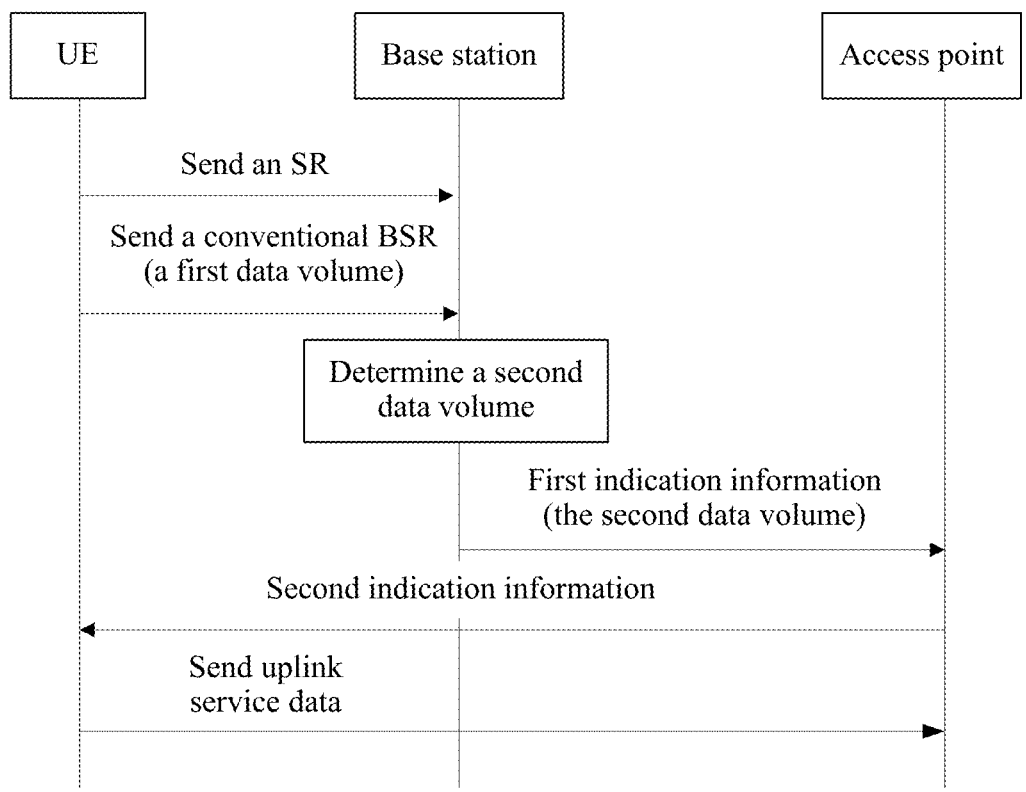
FIG. 5 is a schematic diagram of another specific instance of uplink service data transmission according to an embodiment of this application.

As shown in FIG. 5, what is different from FIG. 4 is: After receiving the SR sent by the UE, the base station does not send the SR to the access point; instead, after receiving a first BSR sent by the UE, the eNB determines, according to loads, channel conditions, and the like of the eNB and the WLAN network and the BSR, how much to-be-sent data is to be offloaded to the WLAN network, that is, determines a second data volume to be scheduled by the access point.

The second data volume is carried in the first indication information by the base station and is sent to the access point. After receiving the first indication information, the access point sends the second indication information to the UE to start to schedule the UE. Then, the UE sends the uplink service data after receiving the second indication information.

Figure 6:
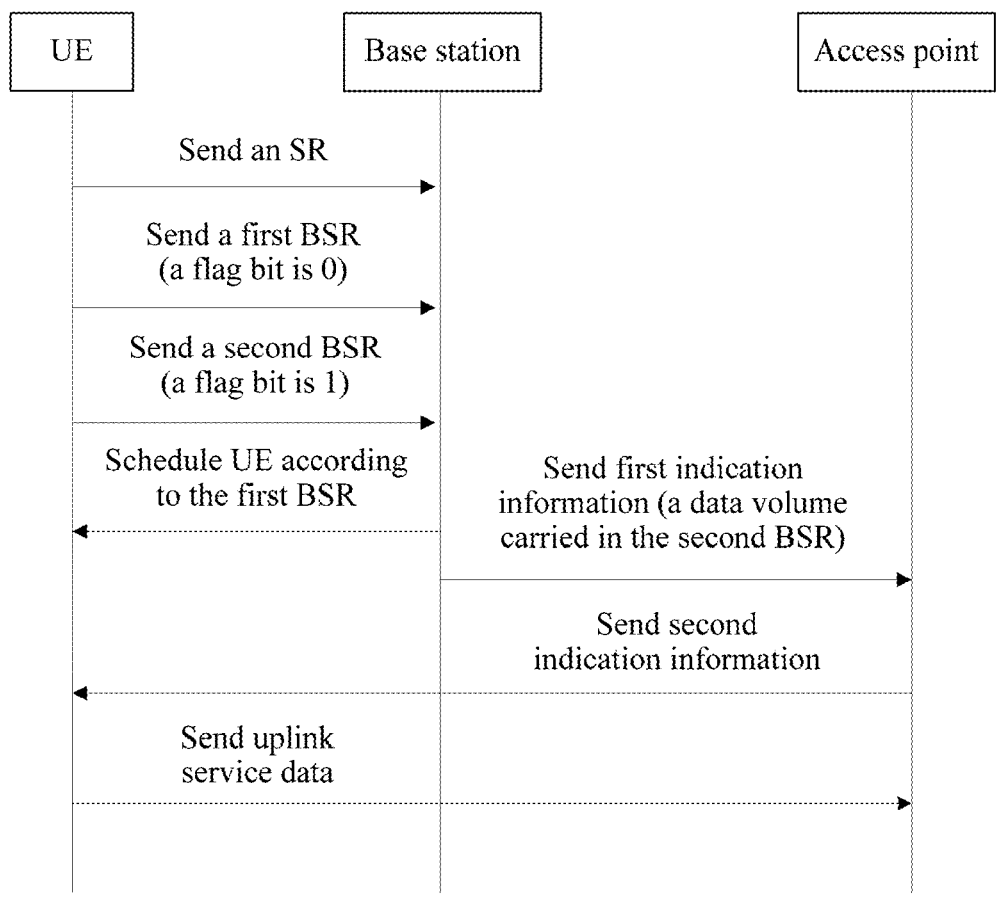
FIG. 6 is a schematic diagram of still another specific instance of uplink service data transmission according to an embodiment of this application.

As shown in FIG. 6, in this embodiment, the UE sends the SR to the base station. Then, the UE sends a second BSR to the base station. After receiving the second BSR, the base station determines, according to a value of a flag bit in the BSR, to offload a service to the access point. The base station sends a data volume carried in the second BSR to the access point by using the first indication information. After receiving the first indication information, the access point sends the second indication information to the UE to start to schedule the UE. Then, the UE sends the uplink service data after receiving the second indication information.

It may be learned from the foregoing description that, in this embodiment of this application, with assistance of a cellular network access device, a WLAN AP can learn whether UE has uplink service data to send, so as to instruct the UE to send the uplink service data, which avoids scheduling performed on UE that has no uplink data, thereby improving channel utilization.

Based on a same inventive concept, an embodiment of this application further provides a wireless local area network access point. For a meaning of a term and specific implementation that are involved in an access point shown in FIG. 7, refer to related descriptions of FIG. 1 to FIG. 6 and the embodiments.

Figure 7:
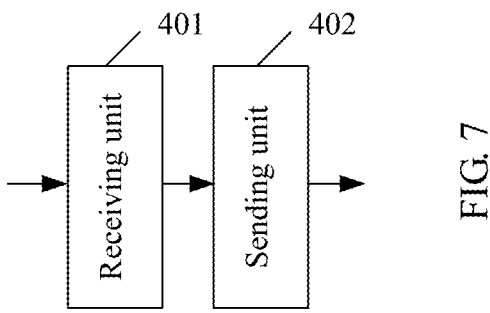
FIG. 7 is a functional block diagram of a wireless local area network access point according to an embodiment of this application.

As shown in FIG. 7, the access point includes: a receiving unit 401, configured to receive first indication information sent by a cellular network access device, where the first indication information is used to instruct the WLAN AP that user equipment UE served by the cellular network access device has uplink service data on which service offloading needs to be performed to the WLAN AP; and a sending unit 402, configured to send second indication information to the UE according to the first indication information, where the second indication information is used to instruct the UE to send the uplink service data to the WLAN AP.

Optionally, the first indication information is further used to notify identification information of the UE to the WLAN AP, and the identification information is used to identify the UE by the WLAN AP.

Optionally, the AP further includes a processing unit, configured to start a timer; after the timer times out, control the receiving unit 401 to stop receiving the uplink service data from the UE; and release a resource that is allocated to the UE to send the uplink service data.

The various types of variations and specific instances in the uplink service data transmission method in the foregoing embodiment in FIG. 1 are also applicable to the access point in this embodiment. With the foregoing detailed description of the uplink service data transmission method, a person skilled in the art can clearly understand the implementation manner of the access point in this embodiment. Therefore, for conciseness of the specification, details are not described herein.

Based on a same inventive concept, an embodiment further provides a wireless local area network access point. For a meaning of a term and specific implementation that are involved in an access point shown in FIG. 8, refer to related descriptions of FIG. 1 to FIG. 6 and the embodiments.

Figure 8:
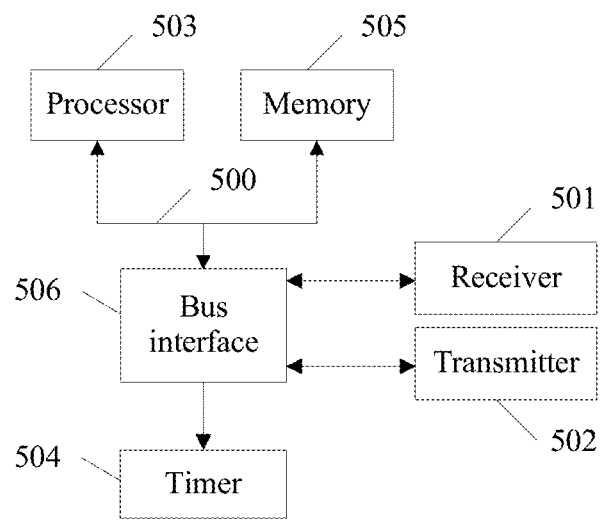
FIG. 8 is a structural diagram of hardware of a wireless local area network access point according to an embodiment of this application.

As shown in FIG. 8, FIG. 8 is a structural diagram of hardware of the access point according to this embodiment. The access point includes: a receiver 501, configured to receive first indication information sent by a cellular network access device, where the first indication information is used to instruct the WLAN AP that user equipment UE served by the cellular network access device has uplink service data on which service offloading needs to be performed to the WLAN AP; and a transmitter 502, configured to send second indication information to the UE according to the first indication information, where the second indication information is used to instruct the UE to send the uplink service data to the WLAN AP.

Optionally, the first indication information is further used to notify identification information of the UE to the WLAN AP, and the identification information is used to identify the UE by the WLAN AP.

Optionally, the AP further includes a processor 503 and a timer 504. The processor 503 is configured to start the timer 504; after the timer 504 times out, determine whether a channel is idle; and if the channel is idle, release a resource that is allocated to the UE to send the uplink service data.

Further, in FIG. 8, there is a bus architecture (represented by a bus 500). The bus 500 may include any quantity of interconnected buses and bridges, and the bus 500 links various circuits including one or more processors represented by the processor 503 and a memory represented by the memory 505. The bus 500 may further link various other circuits such as a peripheral device, a voltage stabilizer, and a power management circuit, which is well known in the art. Therefore, no further description is provided in this specification. A bus interface 506 provides an interface between the bus 500 and the receiver 501 as well as the transmitter 502. The receiver 501 and the transmitter 502 maybe a same element, that is, a transceiver, which provides a unit configured to communicate with various other apparatuses on a transmission medium.

The processor 503 is responsible for managing the bus 500 and general processing, and the memory 505 may be configured to store data used by the processor 503 executing an operation.

The various types of variations and specific instances in the uplink service data transmission method in the foregoing embodiment in FIG. 1 are also applicable to the access point in this embodiment. With the foregoing detailed description of the uplink service data transmission method, a person skilled in the art can clearly understand the implementation manner of the access point in this embodiment. Therefore, for conciseness of the specification, details are not described herein.

Figure 9:
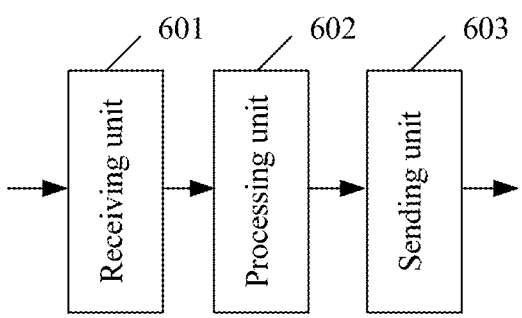
FIG. 9 is a functional block diagram of a cellular network access device according to an embodiment of this application.

Based on a same inventive concept, an embodiment provides a cellular network access device, such as a base station in a cellular network. As shown in FIG. 9, the cellular network access device includes: a receiving unit 601, configured to receive notification information sent by user equipment UE served by the cellular network access device, where the notification information is used to notify the cellular network access device that the UE needs to transmit uplink service data; a processing unit 602, configured to determine, according to the notification information, whether the UE has uplink service data on which service offloading needs to be performed; and a sending unit 603, configured to: if the UE has the uplink service data on which service offloading needs to be performed, send first indication information to a wireless local area network WLAN access point AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

Optionally, the notification information includes an identifier, and the identifier is used to indicate that the uplink service data that needs to be transmitted is the uplink data on which service offloading needs to be performed.

Optionally, the first indication information is further used to notify identification information of the UE to the WLAN AP.

With reference to the foregoing embodiments, the sending unit 603 is further configured to send third indication information to the UE, where the third indication information is used to instruct the UE to send the uplink service data on which service offloading needs to be performed to the WLAN AP.

The various types of variations and specific instances in the uplink service data transmission method in the foregoing embodiment in FIG. 2 are also applicable to the cellular network access device in this embodiment. With the foregoing detailed description of the uplink service data transmission method, a person skilled in the art can clearly understand the implementation manner of the cellular network access device in this embodiment. Therefore, for conciseness of the specification, details are not described herein.

Figure 10:
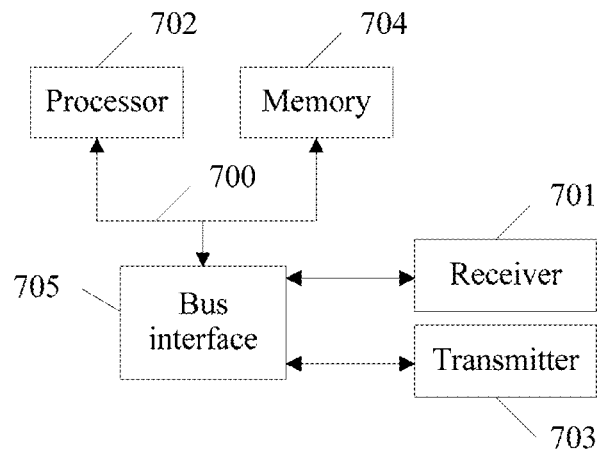
FIG. 10 is a structural diagram of hardware of a cellular network access device according to an embodiment of this application.

Based on a same inventive concept, an embodiment provides a cellular network access device, such as a base station in a cellular network. As shown in FIG. 10, FIG. 10 is a structural diagram of hardware of the cellular network access device according to this embodiment. The cellular network access device includes: a receiver 701, configured to receive notification information sent by user equipment UE served by the cellular network access device, where the notification information is used to notify the cellular network access device that the UE needs to transmit uplink service data; a processor 702, configured to determine, according to the notification information, whether the UE has uplink service data on which service offloading needs to be performed; and a transmitter 703, configured to: if the UE has the uplink service data on which service offloading needs to be performed, send first indication information to a wireless local area network WLAN access point AP, where the first indication information is used to instruct the WLAN AP that the UE has the uplink service data on which service offloading needs to be performed to the WLAN AP and/or indicate a data volume of the uplink service data on which service offloading needs to be performed to the WLAN AP.

Optionally, the notification information includes an identifier, and the identifier is used to indicate that the uplink service data that needs to be transmitted is the uplink data on which service offloading needs to be performed.

Optionally, the first indication information is further used to notify identification information of the UE to the WLAN AP.

Further, in FIG. 10, there is a bus architecture (represented by a bus 700). The bus 700 may include any quantity of interconnected buses and bridges, and the bus 700 links various circuits including one or more processors represented by the processor 702 and a memory represented by the memory 704. The bus 700 may further link various other circuits such as a peripheral device, a voltage stabilizer, and a power management circuit, which is well known in the art. Therefore, no further description is provided in this specification. A bus interface 705 provides an interface between the bus 700 and the receiver 701 as well as the transmitter 703. The receiver 701 and the transmitter 703 maybe a same element, that is, a transceiver, which provides a unit configured to communicate with various other apparatuses on a transmission medium.

The processor 702 is responsible for managing the bus 700 and general processing, and the memory 704 may be configured to store data used by the processor 702 executing an operation.

The various types of variations and specific instances in the uplink service data transmission method in the foregoing embodiment in FIG. 2 are also applicable to the cellular network access device in this embodiment. With the foregoing detailed description of the uplink service data transmission method, a person skilled in the art can clearly understand the implementation manner of the cellular network access device in this embodiment. Therefore, for conciseness of the specification, details are not described herein.

Figure 11:
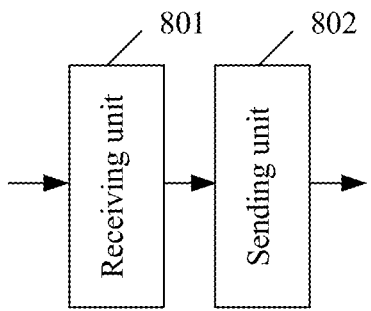
FIG. 11 is a functional block diagram of user equipment according to an embodiment of this application.

Based on a same inventive concept, an embodiment provides user equipment. As shown in FIG. 11, the user equipment includes: a receiving unit 801, configured to receive second indication information sent by a wireless local area network WLAN access point AP according to first indication information received from a cellular network access device serving the UE, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP; and a sending unit 802, configured to send the uplink service data on which service offloading needs to be performed to the WLAN AP.

Optionally, the sending unit 802 is further configured to send notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

Optionally, the notification information includes an identifier, and the identifier is used to indicate that the uplink service data that needs to be transmitted is the uplink service data on which service offloading needs to be performed.

The various types of variations and specific instances in the uplink service data transmission method in the foregoing embodiment in FIG. 3 are also applicable to the user equipment in this embodiment. With the foregoing detailed description of the uplink service data transmission method, a person skilled in the art can clearly understand the implementation manner of the user equipment in this embodiment. Therefore, for conciseness of the specification, details are not described herein.

Figure 12:
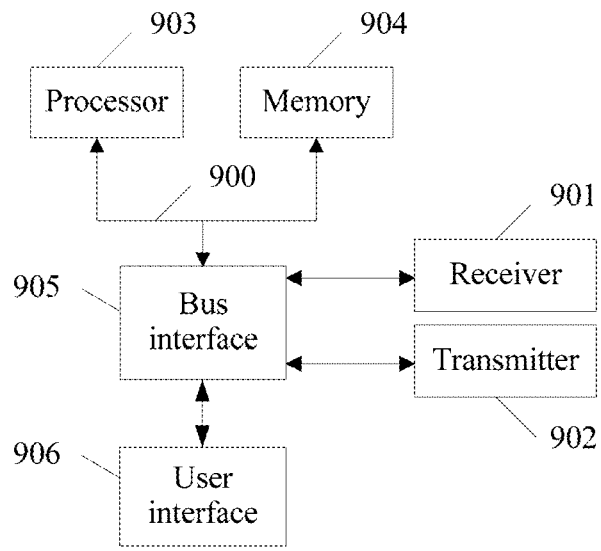
FIG. 12 is a structural diagram of hardware of user equipment according to an embodiment of this application.

Based on a same inventive concept, an embodiment provides user equipment. As shown in FIG. 12, FIG. 12 is a structural diagram of hardware of the user equipment according to this embodiment. The user equipment includes: a receiver 9111, configured to receive second indication information sent by a wireless local area network WLAN access point AP according to first indication information received from a cellular network access device serving the UE, or third indication information sent by the cellular network access device, where the first indication information is used to instruct the WLAN AP that the UE has uplink service data on which service offloading needs to be performed to the WLAN AP or indicate a data volume of the uplink service data on which service offloading needs to be performed to the WLAN AP, and both the second indication information and the third indication information are used to instruct the UE to send the uplink service data on which service offloading needs to be performed to the WLAN AP; and a transmitter 902, configured to send the uplink service data on which service offloading needs to be performed to the WLAN AP.

Optionally, the transmitter 902 is further configured to send notification information to the cellular network access device, where the notification information is used to notify the cellular network access device that the UE needs to transmit uplink service data, so that the cellular network access device determines, according to the notification information, that the UE has the uplink service data on which service offloading needs to be performed to the WLAN AP.

Optionally, the notification information includes an identifier, and the identifier is used to indicate that the uplink service data that needs to be transmitted is the uplink service data on which service offloading needs to be performed.

Further, in FIG. 12, there is a bus architecture (represented by a bus 900). The bus 900 may include any quantity of interconnected buses and bridges, and the bus 900 links various circuits including one or more processors represented by the processor 903 and a memory represented by the memory 904. The bus 900 may further link various other circuits such as a peripheral device, a voltage stabilizer, and a power management circuit, which is well known in the art. Therefore, no further description is provided in this specification. A bus interface 905 provides an interface between the bus 900 and the receiver 901 as well as the transmitter 902. The receiver 901 and the transmitter 902 may be a same element, that is, a transceiver, which provides a unit configured to communicate with various other apparatuses on a transmission medium. Depending on nature of the user equipment, a user interface 906 may further be provided, for example, a keypad, a display, a loudspeaker, a microphone, and a joystick.

The processor 903 is responsible for managing the bus 900 and general processing, and the memory 904 may be configured to store data used by the processor 903 executing an operation.

The various types of variations and specific instances in the uplink service data transmission method in the foregoing embodiment in FIG. 3 are also applicable to the user equipment in this embodiment. With the foregoing detailed description of the uplink service data transmission method, a person skilled in the art can clearly understand the implementation manner of the user equipment in this embodiment. Therefore, for conciseness of the specification, details are not described herein.

The one or more technical solutions provided in the embodiments of this application have at least the following technical effects or advantages:

In an uplink service data transmission method provided in the embodiments of this application, a WLAN AP receives first indication information sent by a cellular network access device, where the first indication information instructs the WLAN AP that UE served by the cellular network access device has uplink service data on which service offloading needs to be performed on the AP; further, the AP sends second indication information to the UE according to the first indication information, where the second indication information is used to instruct the UE to send the uplink service data to the AP. Therefore, in the embodiments, an AP in a non-cellular network can learn, by using the cellular network access device, that the UE has data to send, so as to instruct the UE that has data to send to send the uplink service data. This can avoid low channel utilization that is caused because a polling mechanism in the prior art further needs to perform polling on UE that has no data to send, thereby improving channel utilization.

A person skilled in the art should understand that the embodiments of this application may be provided as a method, a system, or a computer program product. Therefore, this application may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An uplink service data transmission method, comprising:
    receiving, by a wireless local area network (WLAN) access point (AP), first indication information sent by a cellular network access device for instructing the WLAN AP that a user equipment (UE) served by the cellular network access device has uplink service data on which service offloading needs to be performed to the WLAN AP; and
    sending, by the WLAN AP, second indication information to the UE according to the first indication information for instructing the UE to send the uplink service data to the WLAN AP.

2. The method according to claim 1, wherein the first indication information comprises identification information of the UE to identify the UE.

3. The method according to claim 2, wherein the identification information comprises an international mobile subscriber identity (IMSI).

4. The method according to claim 2, wherein the identification information comprises a Media Access Control (MAC) address.

5. The method according to claim 1, wherein the first indication information includes a data volume of the uplink service data.

6. The method according to claim 1, further comprising:
    starting, by the WLAN AP, a timer;
    after the timer times out, determining, by the WLAN AP, whether a channel is idle; and
    when the channel is idle, releasing, by the WLAN AP, a resource that is allocated to the UE to send the uplink service data.

7. A wireless local area network (WLAN) access point (AP), comprising:
    a receiver, configured to receive first indication information sent by a cellular network access device, wherein the first indication information is used to instruct the WLAN AP that a user equipment (UE) served by the cellular network access device has uplink service data on which service offloading needs to be performed to the WLAN AP; and
    a transmitter, configured to send second indication information to the UE according to the first indication information for instructing the UE to send the uplink service data to the WLAN AP.

8. The AP according to claim 7, wherein the first indication information comprises identification information of the UE to identify the UE.

9. The AP according to claim 8, wherein the identification information comprises an international mobile subscriber identity (IMSI).

10. The AP according to claim 8, wherein the identification information comprises a Media Access Control (MAC) address.

11. The AP according to claim 7, wherein the first indication information includes a data volume of the uplink service data.

12. The AP according to claim 11, wherein the AP further comprises:
    a processor, configured to:
        start a timer;
        after the timer times out, determine whether a channel is idle; and
        when the channel is idle, release a resource that is allocated to the UE to send the uplink service data.

13. A cellular network access device, comprising:
    a receiver, configured to receive notification information sent by a user equipment (UE) served by the cellular network access device, wherein the notification information is used to notify the cellular network access device that the UE needs to transmit uplink service data;
    a processor, configured to determine, according to the notification information, whether the UE has uplink service data on which service offloading needs to be performed; and
    a transmitter, configured to: when the UE has the uplink service data on which service offloading needs to be performed, send first indication information to a wireless local area network (WLAN) access point (AP) for at least one of instructing the WLAN AP that the UE has the uplink service data on which service offloading needs to be performed to the WLAN AP or indicating a data volume of the uplink service data on which service offloading needs to be performed to the WLAN AP.

14. The access device according to claim 13, wherein the notification information comprises an identifier for indicating that the uplink service data that needs to be transmitted is the uplink service data on which service offloading needs to be performed.

15. The access device according to claim 13, wherein the first indication information comprises identification information of the UE.

16. The access device according to claim 15, wherein the identification information comprises an international mobile subscriber identity (IMSI).

17. The access device according to claim 15, wherein the identification information comprises a Media Access Control (MAC) address.

18. The access device according to claim 13, wherein the first indication information includes a data volume of the uplink service data.

19. The access device according to claim 13, wherein the transmitter is further configured to send third indication information to the UE for instructing the UE to send the uplink service data on which service offloading needs to be performed to the WLAN AP.

* * * * *